United States Patent
Lühmann et al.

(10) Patent No.: US 6,841,241 B2
(45) Date of Patent: Jan. 11, 2005

(54) REPEATED USE OF AN ADHESIVE-FILM LAMINATE

(75) Inventors: Bernd Lühmann, Norderstedt (DE); Reinhard Storbeck, Hamburg (DE); Christian Harder, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 268 days.

(21) Appl. No.: 10/122,528

(22) Filed: Apr. 15, 2002

(65) Prior Publication Data

US 2002/0168516 A1 Nov. 14, 2002

Related U.S. Application Data

(62) Division of application No. 09/160,777, filed on Sep. 24, 1998, now Pat. No. 6,402,875, which is a continuation of application No. 08/699,811, filed on Aug. 19, 1996, now abandoned.

(30) Foreign Application Priority Data

Aug. 29, 1995 (DE) .......................... 195 31 696

(51) Int. Cl.$^7$ ............................ B32B 15/04; B32B 7/12
(52) U.S. Cl. ...................... 428/343; 428/346; 428/347; 428/349
(58) Field of Search ................................. 428/343, 346, 428/347, 349

(56) References Cited

U.S. PATENT DOCUMENTS 4,024,312 A    5/1977   Korpman

FOREIGN PATENT DOCUMENTS

| DE | 3 331 016 | 10/1984 |
| EP | 696 628 | 2/1996 |
| WO | WO 90/06976 | 6/1990 |
| WO | WO 92/11332 | 7/1992 |
| WO | WO 92/11333 | 7/1992 |

*Primary Examiner*—Atri R. Singh
*Assistant Examiner*—Christopher C Pratt
(74) *Attorney, Agent, or Firm*—Norris McLaughlin & Marcus PA

(57) ABSTRACT

Repeated use of an adhesive-film laminate for bonds which can be redetached without residue by pulling on the laminate in the direction of the bond plane, the laminate employed comprising a) an elastic support with a resilience of at least 50% b) coated on at least one side with a solvent or hot-melt pressure-sensitive acrylate adhesive or dispersion pressure-sensitive acrylate adhesive.

11 Claims, No Drawings

REPEATED USE OF AN ADHESIVE-FILM LAMINATE

This application is a division of U.S. Ser. No. 09/160,777, filed on Sep. 24, 1998, now U.S. Pat. No. 6,402,875, which is, in turn, a continuation of U.S. Ser. No. 08/699,811, filed on Aug. 19, 1996, now abandoned.

The invention relates to the repeated use of an adhesive-film laminate for redetachable bonds, said redetachment taking place by pulling on the laminate in the direction of the bond plane, and to adhesive-film laminates suitable for this purpose.

Adhesive films for redetachable bonds which can be redetached by pulling in the direction of the bond plane are known and are commercially available under the designation "tesa Power-Strips". Bonds produced therewith offer a powerful hold and yet can be redetached without a trace and without damaging the substrate or the bonded parts, as is described in DE 33 31 016 C2. Moreover, DE 42 33 872 C2 describes adhesive films of this kind together with a hook, the hook itself being completely reusable. Despite the many undisputed advantages of these products, they have the disadvantage that the adhesive films cannot be used again and thus repeatedly. Given the considerable price of these adhesive films, this is a significant disadvantage for the user.

Nor from other prior art is it possible to find any such products which can be used again, and thus repeatedly.

WO 92/11333 and WO 93/01979 describe redetachable adhesive tapes with an intermediate support comprising an extensible but not resilient film. Such films, although they can be removed again by pulling in the direction of the bond plane, are in no case reusable, since these products, after "stripping", are unable to relax back into their original state. Admittedly, WO 92/11332 describes redetachable adhesive tapes which also use extensible, resilient films as intermediate supports, but exclusively photopolymerized pressure-sensitive acrylate adhesives are used, which give such products disadvantages whose consequences in practice are decisively disruptive. Reproducible crosslinking of the pressure-sensitive adhesive composition is difficult to attain, resulting in corresponding fluctuations in the product properties. Moreover, a residual content of photoinitiator is unavoidable, which, especially in the case of subsequent bonding under the action of sunlight, for example on window panes, leads to distinct changes in the layer of adhesive; to aftercrosslinking, yellowing and film formation, so that stripping without residue is no longer possible. In addition, the unavoidable content of residual monomer (at least 1%) is objectionable on health grounds, especially for interior applications. Similarly, follow-on products of the photoinitiator, especially methyl benzoate, may lead to migration and alteration of the product properties. The heat of reaction which is liberated during two-dimensional UV polymerization of acrylates may damage or corrugate the support. Compounding with, for example, resins is possible only to a very limited extent, since these resins disrupt UV polymerization. Also, the inevitably obtained crosslinking profile of the adhesive composition is a further disadvantage: normally, UV polymerization is carried out by UV irradiation on the composition side, leading to layers of adhesive with greater crosslinking on the surface of the adhesive than on the support. The result is reduced tack and poor anchorage of the composition. If UV irradiation is carried out through the support, which brings about better tack and improved adhesion and anchorage of the composition, the support must be UV-permeable. However, many supports and many SBS/SIS block copolymers do not possess particularly good UV permeability, or are damaged by UV light.

Overall, the product properties mean that prolonged bonding in constant quality is not ensured, and stripping without residue is in particular not possible, as demonstrated in WO 92/11332 on p. 19, Table 2, column 6, where residues of the composition remain at the edges of the bond (footnote a), if indeed the products do not tear (footnote b). Products which can be used more than once are therefore neither described nor suggested.

Furthermore, U.S. Pat. No. 4,024,312 describes highly extensible adhesive films which have a support consisting of highly elastic, thermoplastically processable styrene block copolymers of type A-B-A (where A=poly(styrene), B=poly (isoprene), poly(butadiene) or hydrogenation products thereof). Resins which can be mixed with the block polystyrene domains can be added, optionally, to the support, preferably in a quantity of from 85 to 200 parts per 100 parts of elastomer. The support is coated on at least one side with a pressure-sensitive adhesive composition. The elastic deformation of the adhesive tapes is at least 200%, and the modulus at 50% extension is <13.8 MPa (2000 lbs/inch$^2$). Elastic reformation after stretching by 50% is at least 75%. The pressure-sensitive adhesive compositions employ either polyisoprene (e.g. natural rubber) or the synthetic rubbers which are also employed for the support material and are based on styrene block polymers, blended with adhesive resins and, if desired, with further blend components. Adhesive tapes can be removed readily from the substrate by stretching parallel to the bond surface. As a result of the migration capacity of the low molecular mass constituents (resins, plasticizers) between pressure-sensitive adhesive composition and support, such self-adhesive tapes are not constant in their product properties: the mechanical strengths of the support and properties of the pressure-sensitive adhesive compositions used are irreversibly altered by the diffusion of the resins. Controlled setting and regulation of the product properties, as is essential for industrial bonds, is therefore not possible. Repeated use is impossible since the support materials coated with rubber adhesive, when stretched parallel to the bond surface, and immediately after detachment from the substrate, shoot back and stick together on the adhesive side with such force that these rubber coatings cannot be detached from one another. Products which can be used more than once are therefore neither described nor suggested.

The object of the invention was to remedy this situation and, in particular, to enable an adhesive-film laminate to be used more than once.

The invention relates accordingly to the repeated use of an adhesive-film laminate, as characterized in more detail in the claims.

BRIEF DESCRIPTION OF THE DRAWING

The invention will now be described in greater detail with reference to the drawing, wherein:

FIG. 1 is a graph showing stripping force as a function of number of times used (sample Example 2b, bonded area; 2 cm ×4 cm.)

Elastic supports are, in particular, elastomers with a resilience of >50%, preferably >80%; during the process of detaching the bonded products, extensions of from 100 to 400% occur on average. Values of up to 1500% may also arise. In this context, the extension which occurs is essentially a function of the tensile expansion behaviour of the type of elastomer employed, of the thickness of the support and of the bond strength which is attained by the adhesive films.

In every case, a prerequisite for residue-free redetachment from the substrate or from the bonded joint is that the tear strength of the adhesive film must be higher than its stripping force. The ratio of tearing force to stripping force is preferably >1.5, particularly preferably >2.5.

The tear strength of the adhesive films described here is determined in particular by the nature and thickness of the support films used. For supports based on styrene block copolymers with a linear three-block structure and block polystyrene contents of from about 15 to 40% by weight, the minimum support thickness for double-sided pressure-sensitive adhesive films, with adhesive forces of >about 5 N/cm, is about 50 µm (see examples). Below this limit, the tear strength is normally too low for redetachment without residue. For substrates with a high degree of adhesion relative to the adhesive films employed (high adhesion forces), the minimum support thickness required is increased correspondingly.

Preferred elastomers are:

1. Styrene block copolymers

Suitable such copolymers are styrene-isoprene and styrene-butadiene block copolymers and their hydrogenation products, styrene-ethylene/butylene and styrene-ethylene/propylene block copolymers. Block copolymers according to the invention can be linear SES (S denotes the polystyrene block, E the elastomer block) three-block polymers, or else radial and star-shaped $(SE)_x$ block copolymers (x denotes the n-functional coupling component) where $n \geq 3$, and linear $(SE)_n$ block polymers.

Typical block polystyrene contents are in the range from about 8 to 50% by weight, preferably between about 15 and 45% by weight. The SE two-block content to be chosen is preferably <50%.

2. Natural rubber
3. Polyisoprene
4. Polybutadiene
5. Polychloroprene rubber
6. Butyl rubber
7. Silicone rubber
8. EPDM rubber or ethylene-propylene copolymers
9. Polyurethanes (e.g. Walopur 2201/Wolff Walsrode, Platilon UO 1/Atochem, Desmopan/Bayer, Elastollan/Elastogran)
10. Vinyl copolymers
10a. Ethylene-vinyl acetate copolymers (e.g. From M & W: 524.060; from Exxon: Exxtraflex Film)
10b. Vinyl chloride-acrylate copolymers
11. Polyether esters (e.g. Arnitel/Akzo, Hytrel/Du Pont)
12. Polyetheramides and polyesteramides (e.g. Pebax/Atochem, Grilon/Ems-Chemie)
13. Polycarbonate-polyester copolymers
14. Ethylene-acrylate copolymers
15. ABS copolymers.

The abovementioned elastomers can also be employed as a constituent in polymer blends.

To establish the mechanical properties, crosslinking of the abovementioned materials may be advantageous.

Suitable pressure-sensitive acrylate adhesives, including blend components (adhesive resins, fillers, pigments) are:

solvent-containing and solvent-free acrylate adhesive compositions: Copolymers based on acrylic acid/methacrylic acid and esters thereof with 1 to 25 carbon atoms, maleic acid, fumaric acid, itaconic acid and their esters, substituted (meth)acrylamides; further vinyl compounds, for example vinyl esters, vinyl acetate, vinyl alcohol and/or esters thereof Compounds of acrylate copolymers and resins, for example Foral 85 E Compounds of various acrylate copolymers Compounds of acrylate copolymers and further polymeric blend components Optionally, additives in the form of inorganic and organic materials can be used in accordance with the invention, examples being glass balls, glass fibres, pigments, anti-ageing agents, carbon black and titanium dioxide.

In order to produce sufficient cohesion, the acrylate copolymers used are normally crosslinked. To achieve uniform crosslinking density across the thickness of the layer, thermally initiated crosslinking methods are appropriate, for example crosslinking by way of metal chelates. A very homogeneous crosslinking profile can also be achieved by means of irradiation with electron beams. The control parameter for the crosslinking density profile is the accelerator voltage of the electron-beam source. Depending on the weight per unit area of the adhesive film to be irradiated, it is possible in this case to choose one-sided irradiation (preferably in the case of low weights per unit area, but also in the case of high weights per unit area if a sufficiently high accelerator voltage is available) or electron-beam irradiation on both sides (preferred in case of high weights per unit area and low accelerator voltages) in order to establish a homogeneous crosslinking density.

As a result of their high molar mass, dispersion acrylates usually have a level of cohesion which is sufficient for the applications described herein, so that no additional crosslinking is generally required.

In order to improve the anchorage of the pressure-sensitive adhesive compositions on the intermediate support, the latter can be given a physical and/or chemical pretreatment (priming). Examples of suitable pretreatment methods are corona pretreatment, flame pretreatment, plasma pretreatment and pretreatment with fluorine.

The products used in accordance with the invention exhibit a range of advantages over the prior art.

Relative to natural rubber- and synthetic rubber-based pressure-sensitive adhesives with olefinic double bonds (DE-33 31 016, U.S. Pat. No. 4,024,312 etc.):

the high ageing resistance, i.e. in particular no loss or rise in the parameters of finger tack, adhesive force and shear strength after ageing, even after severe exposure to sunlight or ozone;

very high transparency coupled with very low inherent colour: systems of water-clear transparency can be produced.

Relative to three-layer laminates with synthetic-rubber pressure-sensitive adhesive based on styrene block polymers (U.S. Pat. No. 4,024,312, etc.):

in the absence of low molecular mass constituents of the adhesive composition, there is no danger of its migration between the laminate layers of the adhesive films and into the surface of the bonded items.

Relative to single-layer laminates and to systems with nonelastic intermediate supports (DE 33 31 016, WO 92/11333, etc.):

separate control of adhesion and tear strength, since the adhesion can be controlled primarily by way of the outer adhesive-tape layers and the tear strength via the internal, middle layer.

Broad capacity for adjusting the stripping forces in the case of residue-free detachment, as a result of the high variability in the moduli of elasticity of the elastic middle layers (support films) which are available.

Relative to UV polymers/UV-crosslinked pressure-sensitive adhesive compositions (WO 92/11332):

- no danger of aftercrosslinking, especially after exposure to sunlight, owing to residual content of UV initiators. No residual content of toxicologically objectionable constituents as are commonly employed in UV-polymerized or, respectively, crosslinked systems.
- Ease of preparation of pressure-sensitive adhesive compositions of specific coloration.
- Possibility of incorporating fillers into the pressure-sensitive adhesive compositions.
- Possibility of using mixtures of already polymerized copolymers.

In general:

- Ease of preparation in the production process, since can be carried out with the customary coating techniques.
- Elastic intermediate supports with elastic reformation of preferably >about 90% can be used repeatedly when sufficiently ageing-resistant pressure-sensitive adhesive compositions are used, since the layer thickness, which primarily determines the product quality (finger tack, adhesive force, shear strength) goes back on extensive reformation to its original extent. In contrast to rubber-based pressure-sensitive adhesive compositions, the auto-adhesive properties of acrylate copolymers can easily be adjusted such that the adhesives are easy to remove from one another even after contact.
- Moreover, the acrylate compositions employed in accordance with the invention, since they can be applied from solution, the melt or dispersion, can be anchored outstandingly to viscoelastic supports. In addition, the compositions do not have the crosslinking profile typical of UV compositions. The crosslinking density is uniform throughout the adhesive layer. This particularly good anchorage of the products is demonstrated by adhesion tests on steel and by failed attempts at delamination. Unlike UV-polymerized products, the products leave no residues of adhesive composition on substrates such as steel, and the anchorage can be improved even further by pretreating the support (corona, flame pretreatment, plasma, primer).

In the text below the intention is to illustrate the invention on the basis of working examples without wishing thereby unnecessarily to restrict the invention.

WORKING EXAMPLES

Preparation of the Pressure-Sensitive Adhesive Compositions

Examples 1 and 2

The following monomer mixtures (quantities given in % by weight) were copolymerized in solution. The polymer batches consisted of 60% by weight of the monomer mixtures and 40% by weight of solvent.

The solutions were first of all freed from oxygen by flushing with nitrogen in customary reaction vessels made of glass or steel (with reflux condenser, stirrer, temperature control meter and gas inlet pipe) and then heated to boiling. A commercial initiator which is customary for free-radical polymerization (Vazo 67 (Akzo)) was added in order to initiate polymerization. During the polymerization period of about 20 hours, dilution was carried out several times with additional solvent where appropriate, depending on viscosity, so that the finished polymer solutions had solids contents of from 35 to 55% by weight.

Example 1

Monomer Mixture (% By Weight) 2-Ethylhexyl acrylate/butyl acrylate/N-tert-butylacryl-amide/acrylic acid/maleic anhydride=39.25/39.25/20/0.5/1

Example 2

Monomer Mixture (% By Weight) Butyl acrylate/isooctyl acrylate/glycidyl methacrylate/acrylic acid=49/49/1/1

The polymers thus prepared can, if required, be blended further correspondingly in accordance with the compounding possibilities listed. This compounding step can, like the processing/coating step, be carried out if desired from solution or in the concentrated state.

The pressure-sensitive adhesion properties of the compositions prepared in this way can be tailored by crosslinking (e.g. chemical crosslinking or irradiation with fast electrons) to the requirements of the end product.

Working Examples II

Test Methods, Sample Preparation, Application Examples

Test Methods:

Maximum Tensile Force, Elongation at Break

The measurements are made in accordance with DIN 53455 and DIN 53815. The pulling speed is 200 mm/min.

Test for Strippability (Bonding in Practice)

The adhesive-film strips tested measure 50 mm×20 mm (length×width) and carry at one end, on both sides, a nonadhesive grip-tab region measuring 9 mm×20 mm. The grip-tab region is obtained by laminating a PETP film 12 μm thick onto both sides of the adhesive-film strip. The pressure-sensitive adhesive areas of the adhesive-film strip are covered on both sides with silicone-treated release paper. One release paper is removed from the adhesive-film strips, which have been stored for 24 h under standard climatic conditions (T=+23° C., 50% relative humidity), and the adhesive-film strip is bonded to a rectangular Resopal plate measuring 100×100 mm (by rolling over it twice with a 2 kg steel roller) in such a way that the grip tab projects about 7 mm beyond one side of the Resopal plate. At this point, after removal of the 2nd release paper, a hardboard plate of identical dimensions is bonded congruently with the Resopal plate on the reverse side of the adhesive-film strip (pressure for 5 seconds with a force of 100 N). The grip-tab film now protrudes about 2 mm into the bonded joint. Corresponding specimens are stored under standard climatic conditions for 48 h. An assessment is made of the number of adhesive-film pieces which tear when the bond is separated. In order to separate the bond, the adhesive strips are pulled out (stripped) by hand, starting from the grip tab and in parallel to the bond plane, out of the bonded joint. The rate of stripping is about 25–100 mm/s.

Stripping Force

The test is carried out on adhesive-film strips measuring 40 mm×20 mm (length×width) which at one end carry a nonadhesive grip tab measuring 9 mm×20 mm. The grip-tab region is obtained by laminating a PETP film 12 μm thick onto both sides of the adhesive-film strips. The adhesive-film strips are stored for 24 hours under standard climatic conditions (T=+23° C., 50% relative humidity) and then bonded to a rectangular polymethyl methacrylate plate of dimensions 5 cm×10 cm×0.3 cm (width×length×thickness) by rolling over them twice with a 2 kg steel roller (rolling rate 10 m/min) such that the grip tab protrudes 7 mm beyond the short side of the PMMA plate. The PMMA plate is clamped into the lower jaw of a dynamometer, with the adhesive-film grip tab fastened in its upper jaw. At a constant separation rate of 150 mm/min, the adhesive-film piece is detached (stripped) almost parallel to the bond plane of the PMMA plate at a pull-off angle of 2 to 3°. While this is done, the pull-off force (stripping force) required [N/cm] is measured. In order to assess the reusability of the adhesive-film strips, after the first separation process the stripping process described is repeated after the adhesive-film strip has been replaced and bonded again.

UV Resistance

Adhesive-film strips measuring 40 mm×20 mm (length× width) are bonded on one side to rectangular polyethylene (PE) plates of dimensions 100 mm×150 mm such that a grip tab measuring 10 mm×20 mm protrudes over one edge of the PE plate. The grip-tab region is obtained by laminating a PETP film 12 µm thick onto both sides of the adhesive-film strip. The samples are irradiated for at least three minutes with UV light (power about 120 watts/cm, lamp type: UV-H from Eltosch; sample distance=10 cm). Manual testing is then carried out to determine whether the adhesive-film strips can be detached without residue and without tearing from the PE substrate by pulling almost parallel to the bond surface. In addition, a comparative, qualitative assessment of the finger tack before and after UV exposure is carried out.

Ozone Resistance/Shear Strength

The tests are carried out on adhesive-film strips measuring 40 mm×20 mm (length×width). An adhesive-film piece of this kind is bonded between two overlapping steel plates of dimensions 50 mm×30 mm (area of overlap surface area of double-sided bond: 20 mm×20 mm). The steel plates bonded in this way are subjected to a shear force of 5 N. The bonded sample strips are stored for 6 days in ozone-enriched air (ozone content=250 ppb, temperature=40° C.). If the sample has not already sheared off, the test is terminated after 6 days and the samples are assessed. This assessment includes manual testing to determine whether the adhesive-film strips can be detached from the steel plates, parallel to the bond surface, in the lengthwise direction of the adhesive strips. The rate of detachment is about 25–100 mm/s. An assessment is made of whether the adhesive-film strips can be detached from the steel substrate without residue and without tearing. In addition, a qualitative assessment is made of the surface and of the finger tack before and after ozone exposure. Furthermore, the ozone resistance of the sample strips (Example 1–6) and of samples as described in DE 33 31 016 C2 is compared.

Residual Monomer Content

The analytical determination of the residual monomer content is carried out by liquid extraction of the pressure-sensitive adhesive compositions used and subsequent capillary gas chromatography. The analytical investigations are aimed primarily at relatively thick layers of adhesive composition, as are preferentially obtained by coatings of hot-melt pressure-sensitive adhesives.

Light Permeability

All of the support materials employed were examined for specific absorption bands in the region of visible light. For this purpose, in addition to a visual comparison, the transmission was measured quantitatively with a photometer (type: Dr. Lange, Lico 200) in the wavelength range from 400 to 800 nm.

Preparation of the Samples (Specimen Examples 1–6)

The intermediate supports of Examples 1a–1c and 2a were obtained as cast films from toluene. The intermediate support of Example 5 was obtained from Wolff Walsrode. The other films are prepared by compression moulding of melted granules in the temperature range T=140–180° C. Prior to coating with pressure-sensitive adhesive compositions, all films were subjected to corona treatment on both sides.

The intermediate supports were coated on both sides with pressure-sensitive adhesive, in each case with an identical amount of adhesive composition being applied. In the listed examples, coating was carried out indirectly by the transfer technique, but can also be carried out directly. The adhesive-film laminates prepared were laminated together with a pressure of from 6 to 7 bar. Finally, the pressure-sensitive adhesive compositions were crosslinked by irradiation on both sides with fast electrons (electron-beam irradiation) or chemically (heat treatment).

The mechanical data of the individual samples can be taken from Table 1. All of the samples can be detached by stripping from Resopal/hardboard bonds without tearing and without residue (see test method: "Testing for stripability").

Typical areas of application for the adhesive-film laminates presented here are:

1. Fastening and hanging of wall hooks, pictures, posters, signs.
2. Joining of articles which are to be separated again at a later point in time (for example for fixing containers for transportation).
3. Sealing of openings (tear-open opening tabs, beverage closures).
4. Reusable, removable write-on labels.

Example 1a–1c

The material employed for the intermediate support is Vector 4461 D (from Exxon). As a pressure-sensitive adhesive layer, use is first made of an acrylate copolymer (see above preparation of the pressure-sensitive adhesive composition, Ex. 1) in a layer thickness of about 600 µm (Example 1a). Furthermore, a pressure-sensitive acrylate adhesive composition (see above preparation of the pressure-sensitive adhesive composition, Ex. 2) was employed with a layer thickness of about 50 µm. In Example 1b this is crosslinked by electron-beam irradiation, in Example 1c by adding a crosslinking agent.

Adhesive-film strips 1a and 1b/1c are notable for their different specific application characteristics (rise in adhesive force after bonding) with respect to rough or smooth substrates. In this context, owing to its high quantity of applied composition, the adhesive-film strip 1a is particularly suitable for bonding to rough substrates, whereas 1b/1c can preferably be used for bonding to smooth substrates. The samples described can be detached very readily by stripping from a Resopal/hardboard bonded joint. Tearing on detachment of the bonded film strips, or residues remaining on both substrates, did not occur when the strips were detached slowly from Resopal/hardboard bonded joints. With very high rates of detachment, tearing of the adhesive films may occur owing to the low tear strength in comparison to the stripping force.

Example 2a/2b

The material employed for the intermediate support was Cariflex TR 1101 (from Shell). The pressure-sensitive adhesive composition used was an acrylate copolymer (see above preparation of the pressure-sensitive adhesive composition, Ex. 1). The layer thicknesses employed for the pressure-sensitive adhesive compositions were 630 µm (Example 2a) and 60 µm (Example 2b).

Samples of Examples 2a/2b are distinguished by particularly good reusability properties. FIG. 1 depicts this connection in graph form: the stripping force [N/cm] required to release the bond for the detachment of sample 2b is plotted as a function of the number of bonds carried out with the same sample. After the first release procedure, only a very slight drop is observed in the stripping force required on subsequent use.

Example 3a/3b

The material employed for the intermediate support was Stereon 841 A (from Firestone). The pressure-sensitive adhesive composition used for Example 3a was an acrylate copolymer (see above preparation of the pressure-sensitive adhesive composition, Ex. 1). For Example 3b, this composition was blended with a rosin (20% Foral 85 E/Hercules GmbH).

In contrast to UV polymers, compounding with resins can be carried out without difficulty in the case of these composition systems. Accordingly, adaptation of the pressure-sensitive adhesive properties to selected composition systems is readily possible.

Example 4

The material employed for the intermediate support was Kraton G 1657 X (from Shell). The pressure-sensitive adhesive composition used was an acrylate copolymer (see above preparation of the pressure-sensitive adhesive composition, Ex. 1). This adhesive composition was likewise blended with a resin (Foral 85 E/Hercules GmbH).

Here too, compounding with resin enables the adhesive force and shear strength to be established in a very specific manner.

Example 5

The material employed for the intermediate support was Walopur 2201 (from Wolff Walsrode). The pressure-sensitive adhesive composition used was an acrylate copolymer (see above preparation of the pressure-sensitive adhesive composition, Ex. 1). The mass was coloured by addition of 0.5% by weight of PV-Gelb GR 03 (from Hoechst AG). With small additions of pigment or dye it is possible to produce coloured adhesive-film strips in a wide variety of colour variations.

Example 6

The material employed for the intermediate support was Vector 4111 D (from Exxon). The pressure-sensitive adhesive composition used was an acrylate copolymer (see above preparation of the pressure-sensitive adhesive composition, Ex. 1). Samples from Example 6 are distinguished by particularly low stripping forces and therefore by great ease of handling.

General Properties of Examples 1–6

UV Resistance

All of the bonded samples were removable by stripping without problems from PE plates after UV irradiation. No residues of composition occurred. In contrast to systems based on synthetic rubber/resin, as described for example in DE 33 31 016 C2, a markedly greater residual finger tack is present after comparable UV exposure. The samples are thereby particularly suitable for bonds to glass and other transparent UV-permeable substrates.

Ozone Resistance

All of the bonded samples could be removed by stripping from steel plates after 6 days without problems, following exposure under an ozone atmosphere. The samples exhibited outstanding resistance to ozone. In contrast to pure systems based on synthetic rubber/resin, as described for example in DE 33 31 016 C2, the synthetic-rubber support materials enveloped with acrylate copolymers exhibited no surface damage by formation of ozone cracks and had mechanical properties (tear strength, maximum tensile force) which were comparable with those prior to storage in ozone. In comparison with systems based on synthetic rubber/resin, a markedly greater residual finger tack is present after comparable exposure to ozone.

Residual Monomer Content

The residual monomer content found for composition 1 is <0.25% by weight. The layers of composition preferably examined were thick layers >500 μm, as are obtained for example by hot-melt processes. Consequently, the content of health-damaging residual monomers is far below the content typically possessed by UV acrylate polymers.

Light Permeability

Products which are composed of the described support materials and acrylate copolymers as pressure-sensitive adhesive layer can be produced as water-clear transparent systems. In resin-free systems, no specific absorption regions were detected. Systems with unsaturated resins, as described for example in DE 33 31 016 C2, usually have clearly visible discolorations.

TABLE 1

Characterization of Application Examples 1–6.

| Application Examples | Support polymer | Film thickness [μ] | Composition | Layer thickness of adhesive composition (per side) [μ] | Product thickness (overall) [μ] | Shear strength | Maximum tensile force [N/cm] | Elongation at break [%] | Stripping force [N/cm] | Resilience [%] | 50% modulus [N/mm²] | 300% modulus [N/mm²] |
|---|---|---|---|---|---|---|---|---|---|---|---|---|
| 1a | Vector 4461 | 92 | Example 1[1)] | 630 | 1352 | still holding after 6 d | 36.5 | 763 | 18 | >95% | 0.6 | 0.1 |
| 1b | Vector 4461 | 92 | Example 2[1)] | 50 | 192 | still holding after 6 d | 24.6 | 732 | 18 | >95% | 3.9 | 0.95 |
| 1c | Vector 4461 | 92 | Example 2[2)] | 50 | 192 | still holding after 6 d | 24.2 | 728 | 16 | >95% | 3.9 | 0.95 |
| 2a | Cariflex TR 1101 | 90 | Example 1[1)] | 630 | 1350 | still holding after 6 d | 27.3 | 1129 | 16 | >99% | — | — |

TABLE 1-continued

Characterization of Application Examples 1–6.

| Application Examples | Support polymer | Film thickness [μ] | Composition | Layer thickness of adhesive composition (per side) [μ] | Product thickness (overall) [μ] | Shear strength | Maximum tensile force [N/cm] | Elongation at break [%] | Stripping force [N/cm] | Resilience [%] | 50% modulus [N/mm²] | 300% modulus [N/mm²] |
|---|---|---|---|---|---|---|---|---|---|---|---|---|
| 2b | Cariflex TR 1101 | 722 | Example 1¹⁾ | 60 | 842 | still holding after 6 d | 155.1 | 1000 | 17 | >99% | 3.7 | 0.8 |
| 3a | Stereon 841 A | 429 | Example 1¹⁾ | 60 | 549 | still holding after 6 d | 49 | 1346 | 24 | >90% | 3.5 | 0.7 |
| 3b | Stereon 841 A | 429 | Example 1 + 20% Foral 85 E¹⁾ | 95 | 619 | still holding after 6 d | 49 | 1346 | 21 | >90% | 3.1 | 0.6 |
| 4 | Kraton G 1657 x | 574 | Example 1 + 20% Foral 85 E¹⁾ | 95 | 764 | still holding after 6 d | 95.4 | 823 | 18 | >97% | 1.3 | 0.4 |
| 5 | Walopur 2201 AU | 150 | Example 1 + 0.5% PV-Gelb GR 03 (Hoechst AG)¹⁾ | 60 | 270 | still holding after 6 d | 90.8 | 800 | 16 | >90% | 5.9 | 2.2 |
| 6 | Vector 4111 D | 543 | Example 1¹⁾ | 60 | 663 | still holding after 6 d | 112 | 1473 | 10 | >94% | 1.4 | 0.5 |

¹⁾Crosslinking of the pressure-sensitive adhesive composition by electron-beam irradiation (70 kGy)
²⁾Chemical crosslinking of the pressure-sensitive adhesive composition. For this purpose, 0.0015 kg of Desmodur L. 75 (Bayer AG) (dissolved in ethyl acetate) and 0.003 kg of zinc chloride (dissolved in isopropanol) were mixed with polymerized acrylate copolymer (according to Example 2) and crosslinking was carried out at a temperature T > 80° C. The weight data are based on 1 kg of base polymer (solids).

What is claimed is:

1. An adhesive film laminate capable of producing a first adhesive bond on a surface and being released from said surface without residue by pulling on the adhesive film laminate in the direction of the plane of bond produced between said adhesive film laminate and said surface, and thereafter being reused to produce a second adhesive bond on said surface or other surface and being released from said surface or other surface by pulling on the adhesive him laminate in the direction of the plane of bond produced between said adhesive film laminate and said surface or other surface, said adhesive film laminate comprising:
   a) an elastic support exhibiting a resilience of at least 80%; and
   b) a solvent or hot-melt pressure-sensitive acrylate adhesive or dispersion pressure-sensitive adhesive coated on at least one side of said elastic support.

2. The adhesive film laminate according to claim 1, wherein the pressure-sensitive acrylate adhesive has a uniform crosslinking profile.

3. The adhesive film laminate according to claim 1, wherein the elastic support is coated on both sides with pressure-sensitive acrylate adhesive.

4. The adhesive film laminate according to claim 1, wherein the elastic support has an adhesion-promoting finish.

5. The adhesive film laminate according to claim 1, wherein the elastic support comprises an elastomer, said elastomer optionally being in the form of a polymer blend and optionally being crosslinked.

6. The adhesive film laminate according to claim 1, wherein the pressure-sensitive acrylate adhesive is based on an acrylate copolymer, which acrylate copolymer is optionally in the form of a compound with resins, other acrylate copolymers, polymeric blood components and/or additives.

7. The adhesive film laminate according to claim 6, wherein the acrylate copolymer comprises acrylic esters and acrylic acid.

8. The adhesive film laminate according to claim 7, wherein the acrylate copolymer comprises one or more acrylic esters selected from the group consisting of 2-ethylhexyl acrylate, butyl acrylate, N-tert-butylacrylamide, isooctyl acrylate and glycidyl methacrylate.

9. The adhesive film laminate according to claim 1, wherein the elastic support has a thickness of 50–1000 μm, the pressure-sensitive adhesive on one or both sides has a thickness in each case of 25–800 μm, and the adhesive film laminate has an overall thickness of 75–2600 μm.

10. The adhesive film laminate according to claim 9, which is water-clear/transparent.

11. The adhesive film laminate according to claim 1, which is dyed, pigmented, filled or water-clear/transparent.

* * * * *

UNITED STATES PATENT AND TRADEMARK OFFICE
CERTIFICATE OF CORRECTION

PATENT NO.       : 6,841,241 B2
APPLICATION NO.  : 10/122528
DATED            : January 11, 2005
INVENTOR(S)      : Luhmann et al.

It is certified that error appears in the above-identified patent and that said Letters Patent is hereby corrected as shown below:

In the Specification

Column 3, Line 10, "of >about 5" should read -- of > about 5 --

Column 5, Line 18, "preferably >about 90%" should read -- preferably > about 90% --

In the Claims

Column 11, Line 40, Claim 1, "adhesive him" should read -- adhesive film --

Column 12, Line 38, Claim 6, "polymeric blood components" should read -- polymeric blend components --

Signed and Sealed this
Eighteenth Day of February, 2014

Michelle K. Lee
*Deputy Director of the United States Patent and Trademark Office*